United States Patent
Huang et al.

(10) Patent No.: US 11,411,395 B2
(45) Date of Patent: Aug. 9, 2022

(54) ELECTROSTATIC DISCHARGE PROTECTION CIRCUIT AND OPERATION METHOD

(71) Applicant: Realtek Semiconductor Corporation, Hsinchu (TW)

(72) Inventors: Chung-Yu Huang, Tainan (TW); Tay-Her Tsaur, Zhubei (TW); Po-Ching Lin, Zhubei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 21 days.

(21) Appl. No.: 16/672,671

(22) Filed: Nov. 4, 2019

(65) Prior Publication Data

US 2021/0013714 A1    Jan. 14, 2021

(30) Foreign Application Priority Data

Jul. 10, 2019   (TW) ................... 108124377

(51) Int. Cl.
*H02H 9/04*   (2006.01)

(52) U.S. Cl.
CPC .................... *H02H 9/046* (2013.01)

(58) Field of Classification Search
CPC .............. H02H 9/04; H02H 9/045–047; H01L 27/0248–0255; H01L 27/0266; H01L 27/0285; H01L 27/0296
See application file for complete search history.

(56) References Cited

U.S. PATENT DOCUMENTS

| | | | |
|---|---|---|---|
| 2003/0227304 A1* | 12/2003 | Saito | H03K 19/00315 327/108 |
| 2005/0219782 A1 | 10/2005 | Chen | |
| 2009/0091871 A1* | 4/2009 | Hung | H02H 9/046 361/56 |
| 2009/0213508 A1* | 8/2009 | Hsihe | H01L 27/0266 361/56 |
| 2010/0053827 A1* | 3/2010 | Kawano | H02H 9/046 361/56 |
| 2010/0195358 A1* | 8/2010 | Erbito, Jr. | G05F 1/56 363/84 |
| 2011/0187435 A1* | 8/2011 | Kamata | H01L 27/1225 327/306 |

(Continued)

FOREIGN PATENT DOCUMENTS

| | | |
|---|---|---|
| CN | 103296666 A | 9/2013 |
| CN | 103872670 A | 6/2014 |
| CN | 106410773 A | 2/2017 |

*Primary Examiner* — Fred E Finch, III
(74) *Attorney, Agent, or Firm* — Locke Lord LLP; Tim Tingkang Xia, Esq.

(57) ABSTRACT

An electrostatic discharge protection circuit includes a voltage drop circuit, a detector circuit, and a clamping circuit. The voltage drop circuit is configured to generate a second voltage according to a first voltage. The second voltage is smaller than the first voltage. The detector circuit is coupled to the voltage drop circuit. The detector circuit is configured to generate a control signal according to the second voltage and an input voltage. The clamping circuit is coupled to the voltage drop circuit and the detector circuit. The clamping circuit is configured to provide an electrostatic discharge path according to a voltage level of the control signal.

15 Claims, 4 Drawing Sheets

(56) References Cited

U.S. PATENT DOCUMENTS

| | | | |
|---|---|---|---|
| 2012/0286843 A1* | 11/2012 | Kurokawa | H01L 27/0266 327/318 |
| 2013/0050885 A1* | 2/2013 | Chen | H02H 9/046 361/56 |
| 2013/0114172 A1 | 5/2013 | Huang et al. | |
| 2013/0229736 A1* | 9/2013 | Van Der Borght | H02H 9/046 361/56 |
| 2013/0229740 A1* | 9/2013 | Yasuda | H01L 27/0285 361/90 |
| 2014/0185167 A1* | 7/2014 | Peng | H02H 9/046 361/56 |
| 2014/0240036 A1* | 8/2014 | Kurokawa | H02H 9/04 327/537 |
| 2015/0077886 A1* | 3/2015 | Chen | H02H 9/046 361/56 |
| 2015/0124359 A1* | 5/2015 | Cao | H02H 9/04 361/56 |
| 2015/0124362 A1* | 5/2015 | Huang | H02H 9/046 361/56 |
| 2015/0288172 A1* | 10/2015 | Yeh | H02H 9/046 361/56 |
| 2015/0288173 A1* | 10/2015 | Chen | H02H 9/046 361/56 |
| 2017/0170165 A1* | 6/2017 | Chen | H01L 27/0629 |
| 2018/0026440 A1* | 1/2018 | Zhao | H02H 9/041 361/56 |
| 2018/0301898 A1* | 10/2018 | Hsu | H01L 27/0285 |
| 2019/0326751 A1* | 10/2019 | Xi | H02H 9/046 |
| 2019/0341772 A1* | 11/2019 | Hsu | H02H 1/0007 |
| 2019/0393866 A1* | 12/2019 | Wu | H03K 19/00361 |
| 2020/0373294 A1* | 11/2020 | Su | H01L 27/0266 |

* cited by examiner

ELECTROSTATIC DISCHARGE PROTECTION CIRCUIT AND OPERATION METHOD

RELATED APPLICATIONS

This application claims priority to Taiwanese Application Serial Number 108124377, filed Jul. 10, 2019, which is herein incorporated by reference.

BACKGROUND

Technical Field

The present disclosure relates to a circuit technology. More particularly, the present disclosure relates to an electrostatic discharge protection circuit and an operation method.

Description of Related Art

With development of integrated circuits (ICs) technology, sizes of transistors become smaller. Accordingly, withstand voltages of transistors become smaller. In order to prevent the integrated circuits from suffering excessive electrical overstress (EOS) caused by electrostatic discharge (ESD), electrostatic discharge protection circuits are used to protect the integrated circuits.

SUMMARY

One embodiment of the present disclosure is related to an electrostatic discharge protection circuit. The electrostatic discharge protection circuit includes a voltage drop circuit, a detector circuit, and a clamping circuit. The voltage drop circuit is configured to generate a second voltage according to a first voltage. The second voltage is smaller than the first voltage. The detector circuit is coupled to the voltage drop circuit. The detector circuit is configured to generate a control signal according to the second voltage and an input voltage. The clamping circuit is coupled to the voltage drop circuit and the detector circuit. The clamping circuit is configured to provide an electrostatic discharge path according to a voltage level of the control signal.

One embodiment of the present disclosure is related to an electrostatic discharge protection circuit. The electrostatic discharge protection circuit includes a first pad, a detector circuit, and a clamping circuit. The first pad is configured to receive an input voltage and coupled to a first diode and a second diode. The detector circuit is configured to output a control signal according to the input voltage and a first voltage. The clamping circuit is configured to provide an electrostatic discharge path according to a voltage level of the control signal.

One embodiment of the present disclosure is related to an operation method of an electrostatic discharge protection circuit. The operation method includes: generating a second voltage, by a voltage drop circuit, according to a first voltage, generating a control signal, by a detector circuit, according to the second voltage and an input voltage; and providing an electrostatic discharge path, by a clamping circuit, according to a voltage level of the control signal.

As show in the above embodiments, the electrostatic discharge protection circuit and the operation method of the present disclosure provide the electrostatic discharge path to protect the integrated circuits.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
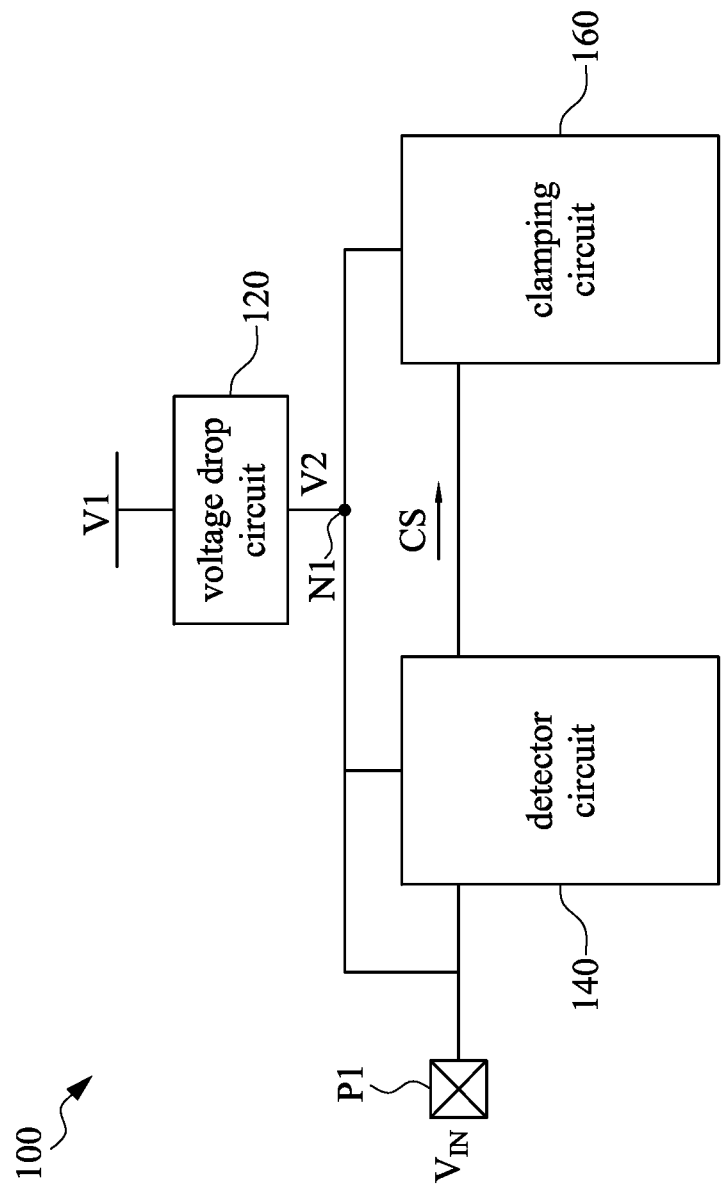
FIG. 1 is a functional block diagram illustrating an electrostatic discharge protection circuit according to some embodiments of the present disclosure.

Reference is now made in detail to the present embodiments of the disclosure, examples of which are illustrated in the accompanying drawings. Wherever possible, the same reference numbers are used in the drawings and the description to refer to the same or like parts. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure.

In the present disclosure, "connected" or "coupled" may be referred to "electrically connected" or "electrically coupled." "Connected" or "coupled" may also be referred to operations or actions between two or more elements.

Reference is made to FIG. 1. FIG. 1 is a functional block diagram illustrating an electrostatic discharge (ESD) protection circuit 100 according to some embodiments of the present disclosure. The electrostatic discharge protection circuit 100 may be applied to an integrated circuit, to prevent the integrated circuit from suffering excessive electrical overstress (EOS).

As illustrated in FIG. 1, the electrostatic discharge protection circuit 100 includes a voltage drop circuit 120, a detector circuit 140, and a clamping circuit 160. The voltage drop circuit 120, the detector circuit 140 and the clamping circuit 160 are coupled at a node N1. The voltage drop circuit 120 receives a voltage V1 and generates a voltage V2 at the node N1 according to the voltage V1. The voltage V2 Is lower than the voltage V1. The voltage V1 is, for example, 3.3 volts. The voltage V2 is, for example, 2.3 volts. In some embodiments, the voltage V1 is from a power source. The values of the voltages above are given for illustrative purposes only. Various values of the voltages are within the contemplated scope of the present disclosure. In some embodiments, electrostatic discharge protection circuit 100 further includes a pad P1. The pad P1 is, for example, an input/output pad (I/O pad) and coupled to input/output elements or core devices. The pad P1 is configured to receive an input voltage $V_{IN}$. The detector circuit 140 generates a control signal CS according to the input voltage $V_{IN}$ and the voltage V2. The clamping circuit 160 provides an electrostatic discharge path according to the voltage V2 and a voltage level of the control signal CS.

With the configurations of the voltage drop circuit 120, the clamping circuit 160 may operate under a lower voltage, e.g., the voltage V2. Accordingly, sizes of transistors of the clamping circuit 160 can be smaller, and the electrostatic discharge path can also be provided effectively.

Figure 2:
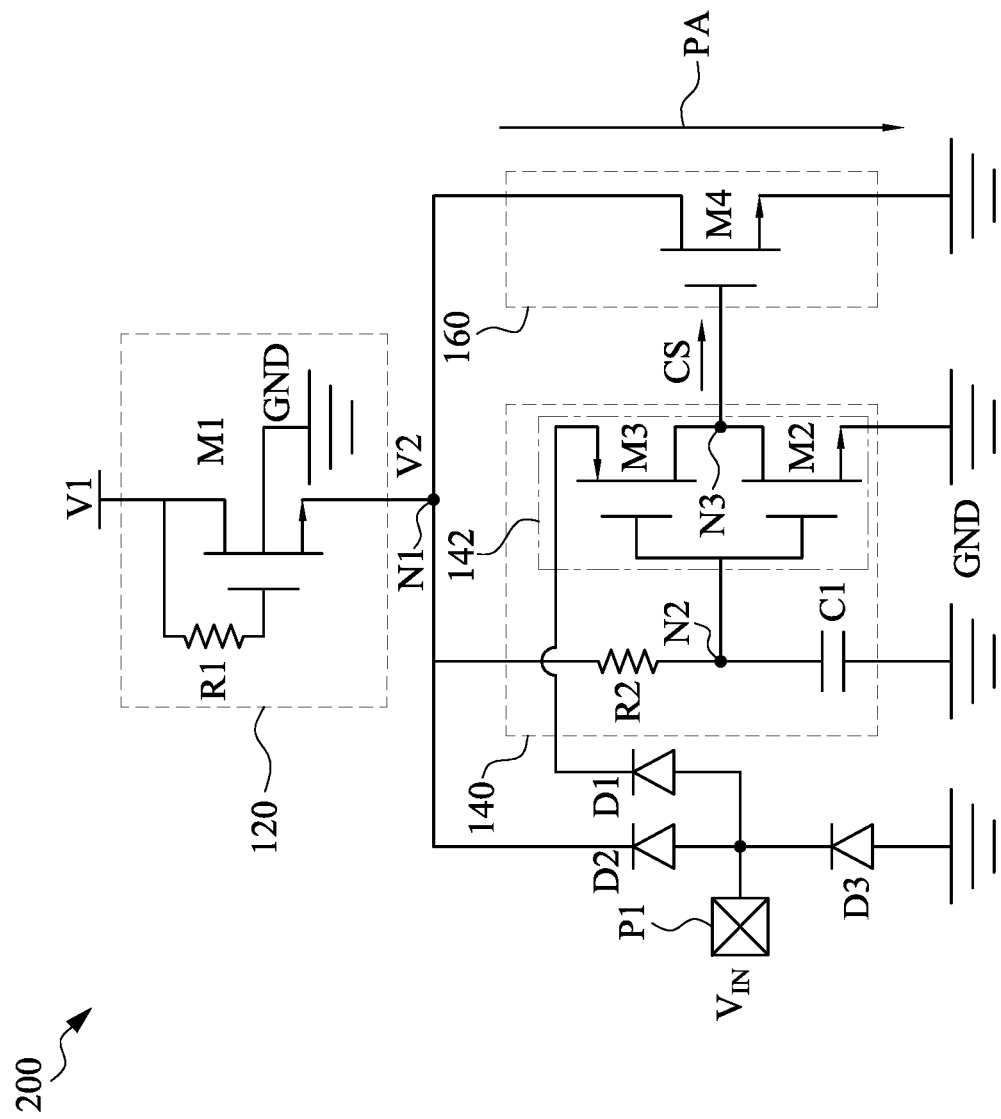
FIG. 2 is a circuit diagram illustrating an electrostatic discharge protection circuit according to some embodiments of the present disclosure.
Figure 3:
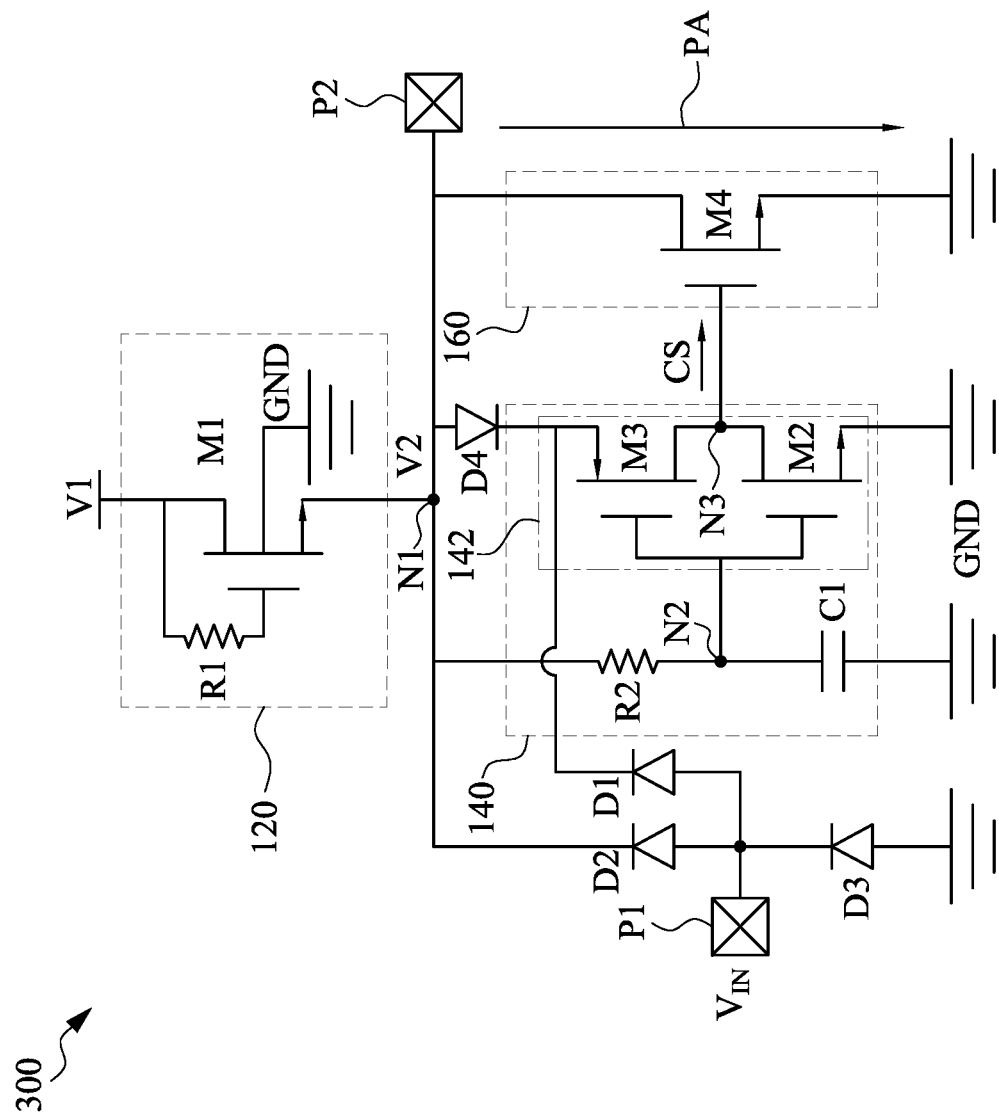
FIG. 3 is a circuit diagram illustrating an electrostatic discharge protection circuit according to some embodiments of the present disclosure.

In some embodiments, a diode is disposed in a path between the pad P1 and the node N1, and another diode is disposed in a path between the pad P1 and the detector circuit 140, as illustrated in following FIGS. 2-3.

Reference is made to FIG. 2. FIG. 2 is a circuit diagram illustrating an electrostatic discharge protection circuit 200 according to some embodiments of the present disclosure.

In some embodiments, the voltage drop circuit 120 includes a transistor M1. The transistor M1 is, for example, an N-type transistor. As illustrated in FIG. 2, the transistor M1 is an N-type MOS (NMOS), but the present disclosure is not limited thereto. The transistor M1 includes a first terminal (a source terminal), a second terminal (a drain terminal), a control terminal (a gate terminal), and a base terminal. The first terminal of the transistor M1 is coupled to the node N1, the second terminal of the transistor M1 receives the voltage V1, and the base terminal of the transistor M1 is coupled to ground GND. In some embodiments, the voltage drop circuit 120 further includes a resistor R1. The resistor R1 is coupled between the second terminal of the transistor M1 and the control terminal of the transistor M1. As described above, in some embodiments, the voltage V1 is from a power source. With the configuration of the resistor R1, the control terminal of the transistor M1 is not directly coupled to the power source, to enhance reliability of the transistor M1. In addition, the base terminal of the transistor M1 is coupled to ground GND, to increase an equivalent resistor of the transistor M1. Accordingly, the voltage V2 may be lower. Thus, the sizes of the transistors of the clamping circuit 160 can be smaller.

The implementations of the voltage drop circuit 120 above are given for illustrative purposes only. Various implementations of the voltage drop circuit 120 are within the contemplated scope of the present disclosure. For example, the voltage drop circuit 120 may be implemented by a PMOS, a diode, a BJT transistor, a resistor, or a combination thereof.

In some embodiments, the detector circuit 140 includes a capacitor C1, a resistor R2, and an inverter circuit 142. The capacitor C1, the resistor R2, and the inverter circuit 142 are coupled at a node N2. The inverter circuit 142 outputs the control signal CS to the clamping circuit 160 according to a voltage level at the node N2. The voltage level at the node N2 is associated to the voltage V2 and the input voltage $V_{IN}$. For example, the control signal CS has a low (high) voltage level when the voltage level at the node N2 has a high (low) voltage level. As illustrated in FIG. 2, the capacitor C1 includes a first terminal and a second terminal. The first terminal of the capacitor C1 is coupled to ground GND, and the second terminal of the capacitor C1 is coupled to the node N2. The resistor R2 includes a first terminal and a second terminal. The first terminal of the resistor R2 is coupled to the node N2, and the second terminal of the resistor R2 is coupled to the node N1. The inverter circuit 142 includes a transistor M2 and a transistor M3. The transistors M2 and M3 are, for example, an N-type transistor and a P-type transistor, respectively. As illustrated in FIG. 2, the transistor M2 is an NMOS, and the transistor M3 is a PMOS, but the present disclosure is not limited thereto.

Each of the transistor M2 and the transistor M3 includes a first terminal, a second terminal, and a control terminal. The first terminal of the transistor M2 is coupled to ground GND. The first terminal of the transistor M3 is coupled to a diode D1. The second terminal of the transistor M3 and the second terminal of the transistor M2 are coupled at a node N3, and the control terminal of the transistor M3 and the control terminal of the transistor M2 are coupled at the node N2.

The implementations of the detector circuit 140 above are given for illustrative purposes only. Various implementations of the detector circuit 140 are within the contemplated scope of the present disclosure. For example, the capacitor C1 may be implemented by a Metal-Oxide-Metal (MOM) capacitor or a Metal-Insulator-Metal (MIM) capacitor. In some other embodiments, the capacitor C1 may be replaced with a diode, an NMOS, or a PMOS.

In some embodiments, the clamping circuit 160 includes a transistor M4. The transistor M4 is, for example, an N-type transistor. As illustrated in FIG. 2, the transistor M4 is an NMOS, but the present disclosure is not limited thereto. The transistor M4 includes a first terminal, a second terminal, and a control terminal. The first terminal of the transistor M4 is coupled to ground GND, the second terminal of the transistor M4 is coupled to a diode D2, and the control terminal of the transistor M4 is coupled to the node N3 to receive the control signal CS. The transistor M4 is turned on when the control signal CS has a high voltage level. Accordingly, the clamping circuit 160 is able to provide an electrostatic discharge path PA. The transistor M4 is turned off when the control signal CS has a low voltage level. Accordingly, the electrostatic discharge path PA is cut off.

The implementations of the clamping circuit 160 above are given for illustrative purposes only. Various implementations of the clamping circuit 160 are within the contemplated scope of the present disclosure. For example, the transistor M4 may be implemented by an N-type BJT or a P-type transistor. However, when the transistor M4 is implemented by a P-type transistor (for example, a PMOS or a P-type BJT), the inverter circuit 142 may be implemented by two-stage inverters coupled in series, or the control terminal (or the base terminal) of the transistor M4 may be directly coupled to the node N2.

As described above, with the configuration of the voltage drop circuit 120, the clamping circuit 160 is able to operate under a lower voltage, e.g., the voltage V2. Accordingly, a channel length of the transistor M4 of the clamping circuit 160 may be smaller, to reduce a turned-on resistor (Ron) of the transistor M4. When the turned-on resistor (Ron) of the transistor M4 is reduced, the voltage level at the node N1 is lower. Thus, damage to the input-/output elements or the core devices coupled to the pad P1 can be prevented.

With respect to operation, when there is no electrostatic discharge event, the transistor M3 is not turned on, and the control signal CS has a low voltage level. At this time, the transistor M4 of the clamping circuit 160 is turned off to prevent the leakage from flowing through the electrostatic discharge path PA. When an electrostatic discharge event occurs at the pad P1, the voltage level of the input voltage $V_{IN}$ and the voltage level at the node N1 are rapidly pulled up. The pulled-up voltage level at the node N1 charge the capacitor C1 via the resistor R2. A resistor-capacitor delay (RC delay) is formed by the resistor R2 and the capacitor C1, and the resistor-capacitor delay is corresponding to a time constant. Thus, the voltage level at the node N2 is pulled up slowly. Before the voltage level at the node N2 is pulled up to a high voltage level (i.e., the voltage level at the node N2 being a low voltage level), the control signal CS has a high voltage level. Accordingly, the transistor M4 is turned on to provide the electrostatic discharge path PA. The electrostatic discharge current flows to ground GND via the electrostatic discharge path PA. After a period of time, the voltage level at the node N2 is pulled up to have a high voltage level. At this time, the control signal CS has a low voltage level. Accordingly, the transistor M4 is turned off. The electrostatic discharge path PA is cut off.

As described above, with the configuration of the voltage drop circuit 120, the voltage V2 at the node N1 is lower (for example, lower than the voltage V1). In other words, the voltage level at the node N2 is lower when the electrostatic discharge event occurs or the electrostatic discharge protection circuit 200 operates under a system discharge mode (system ESD). Thus, the voltage level of the control signal CS is higher, and the transistor M4 is easier to be turned on, to effectively provide the electrostatic discharge path PA.

In some embodiments, electrostatic discharge protection circuit 200 further includes the diode D1, the diode D2, and a diode D3. The diode D1 is coupled between the pad P1 and the detector circuit 140. The diode D2 is coupled between the pad P1 and the clamping circuit 160. The diode D3 is coupled between the pad P1 and ground GND. When the transistor M4 is turned on to discharge the electrostatic discharge current, the voltage level at the second terminal (the drain terminal) of the transistor M4 is pulled down. The second terminal of the transistor M4 and the first terminal of the transistor M3 are coupled to the diode D2 and the diode D1 respectively, so the voltage level at the first terminal of the transistor M3 is not directly affected by the voltage level at the second terminal of the transistor M4. Accordingly, the voltage level at the second terminal of the transistor M3 (the control signal CS) is not affected, to ensure a turned-on degree of the transistor M4. In addition, the voltage level at the control terminal of the transistor M4 (the control signal CS) is not pulled down according to the voltage level at the second terminal of the transistor M4, so a size of the transistor M4 can be smaller.

In some embodiments, electrostatic discharge protection circuit 200 may exclude the voltage drop circuit 120, and the power source directly supplies the voltage V1 to the node N1. Thus, the detector circuit 140 generates the control signal CS according to the input voltage $V_{IN}$ and the voltage V1. The clamping circuit 160 provides the electrostatic discharge path PA according to the voltage level of the control signal CS.

Reference is made to FIG. 3. FIG. 3 is a circuit diagram illustrating an electrostatic discharge protection circuit 300 according to some embodiments of the present disclosure. For ease of understanding, similar elements in FIG. 3, with respect to those in FIG. 2, are designated with the same reference numbers. Difference between FIG. 3 and FIG. 2 is described in the following paragraphs.

As illustrated in FIG. 3, electrostatic discharge protection circuit 300 further includes a pad P2 and a diode D4. In some embodiments, the pad P2 is an input/output pad (I/O pad) and is coupled to the node N1. The diode D4 is coupled between the node N1 and the detector circuit 140. The diode D4 includes a first terminal (an anode terminal) and a second terminal (a cathode terminal). The first terminal of the diode D4 is coupled to the node N1, and the second terminal of the diode D4 is coupled to the first terminal of the transistor M3. Accordingly, the voltage level at the first terminal of the transistor M3 may be generated according to the voltage level at the node N. Thus, the inverter circuit 142 can operate normally when an electrostatic discharge event occurs at the pad P2.

In some other embodiments, the electrostatic discharge protection circuit 300 may exclude the diode D4, and the node N1 is directly coupled to the first terminal of the transistor M3. In addition, the implementations of the diodes D1-D4 above are given for illustrative purposes only. The diodes D1-D4 may be implemented by NMOSs, PMOSs, or resistors. In some embodiments, the diode D4 or other elements (for example, the NMOSs, the PMOSs, or the resistors) having the same functions may be referred as another voltage drop circuit.

In some other embodiments, the power source generating the voltage V1 is coupled to another electrostatic discharge protection circuit. Thus, when an electrostatic discharge event occurs at the power source, the another electrostatic discharge protection circuit may provide another electrostatic discharge path, to prevent the integrated circuits from damage.

Figure 4:
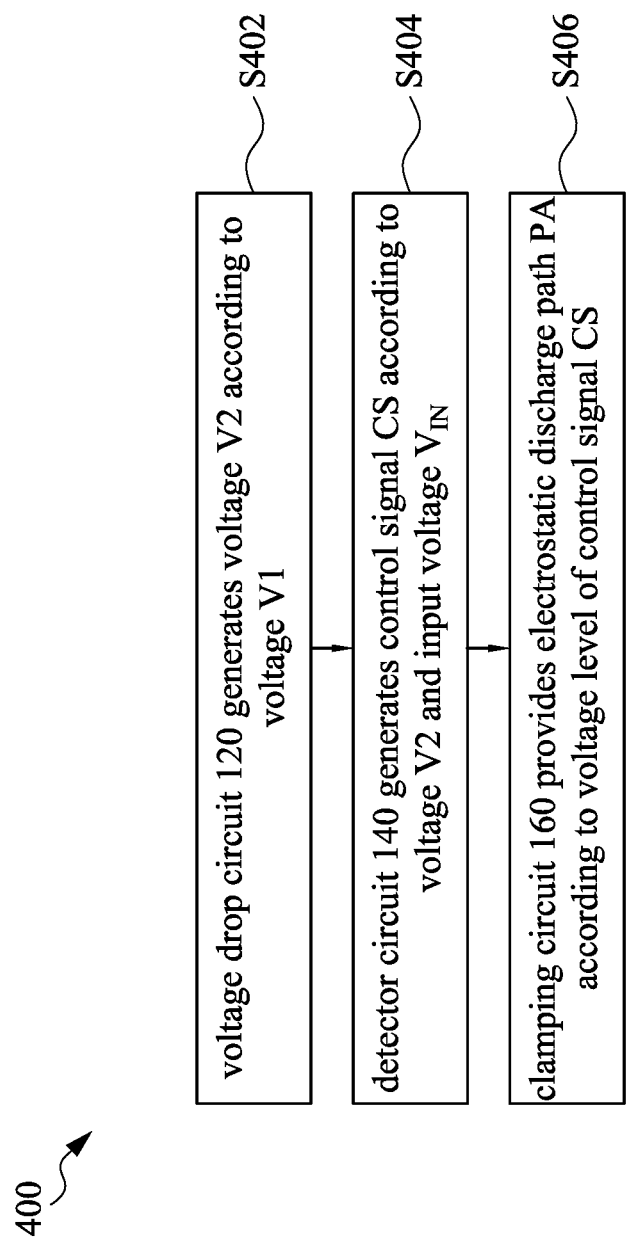
FIG. 4 is a flow diagram illustrating an operation method of an electrostatic discharge protection circuit according to some embodiments of the present disclosure.

Reference is made to FIG. 4. FIG. 4 is a flow diagram illustrating an operation method 400 of an electrostatic discharge protection circuit according to some embodiments of the present disclosure. The operation method 400 includes operations S402, S404, and S406. In some embodiments, the operation method 400 is applied to the electrostatic discharge protection circuit 100 in FIG. 1, but the present disclosure is not limited thereto. For better understanding of the present disclosure, the operation method 400 is discussed with reference to FIG. 1.

In operation S402, the voltage drop circuit 120 generates the voltage V2 according to the voltage V1. The voltage V2 is lower than the voltage V1.

In operation S404, the detector circuit 140 generates the control signal CS according to the voltage V2 and the input voltage $V_{IN}$. In some embodiments, when there is no electrostatic discharge event, the transistor M3 is not turned on, and the control signal CS has a low voltage level. When an electrostatic discharge event occurs at the pad P1, the voltage level of the input voltage $V_{IN}$ and the voltage level at the node N1 are rapidly pulled up, and the control signal CS has a high voltage level. After a period of time, the voltage level at the node N2 is pulled up to be high. At this time, the control signal CS has a low voltage level.

In operation S406, the clamping circuit 160 provides the electrostatic discharge path PA according to the voltage level of the control signal CS. In some embodiments, the transistor M4 is turned on when the control signal CS has a high voltage level. Accordingly, the clamping circuit 160 provides the electrostatic discharge path PA, to discharge the electrostatic discharge current.

As show in the above embodiments, the electrostatic discharge protection circuit and the operation method of the present disclosure provide the electrostatic discharge path to protect the integrated circuits.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electrostatic discharge protection circuit, comprising:
   a voltage drop circuit configured to generate a second voltage according to a first voltage, wherein the second voltage is smaller than the first voltage;
   a detector circuit coupled to the voltage drop circuit, wherein the detector circuit is configured to generate a control signal according to the second voltage and an input voltage;
   a clamping circuit coupled to the voltage drop circuit and the detector circuit, wherein the clamping circuit is configured to provide an electrostatic discharge path according to a voltage level of the control signal; and
   a voltage difference circuit comprising a first diode, wherein the first diode comprises an anode terminal and a cathode terminal, the anode terminal of the first diode is directly coupled to a first node, and the cathode terminal of the first diode is directly coupled to the detector circuit,
   wherein the clamping circuit, the voltage drop circuit, and a first pad are coupled at the first node, wherein the first pad is configured to receive the input voltage,
   wherein the voltage drop circuit, the detector circuit, and the clamping circuit are coupled at the first node, and the voltage drop circuit is configured to generate the second voltage at the first node.

2. The electrostatic discharge protection circuit of claim 1, wherein the voltage drop circuit comprises:
   a transistor comprising a first terminal, a second terminal, and a base terminal, wherein the first terminal of the transistor is coupled to the detector circuit and the clamping circuit, the second terminal of the transistor is configured to receive the first voltage, and the base terminal of the transistor is coupled to ground.

3. The electrostatic discharge protection circuit of claim 2, wherein the voltage drop circuit further comprises:
   a resistor coupled between the second terminal of the transistor and a control terminal of the transistor.

4. The electrostatic discharge protection circuit of claim 1, wherein the detector circuit comprises:
   a capacitor coupled to ground;
   a resistor, wherein the resistor and the capacitor are coupled at a second node; and
   an inverter circuit configured to output the control signal to the clamping circuit according to a voltage level at the second node.

5. The electrostatic discharge protection circuit of claim 4, wherein the clamping circuit provides the electrostatic discharge path when the control signal has a first voltage level, and the electrostatic discharge path is cut off when the control signal has a second voltage level, wherein the inverter circuit is configured to generate the control signal having the second voltage level according to a time constant corresponding to the resistor and the capacitor.

6. The electrostatic discharge protection circuit of claim 4, wherein the inverter circuit is coupled to the first pad via a second diode, and the clamping circuit is coupled to the first pad via a third diode.

7. The electrostatic discharge protection circuit of claim 6, wherein the inverter circuit comprises:
   a first transistor comprising a first terminal, a second terminal, and a control terminal, wherein the first terminal of the first transistor is coupled to ground; and
   a second transistor comprising a first terminal, a second terminal, and a control terminal, wherein the first terminal of the second transistor is coupled to the second diode, the second terminal of the second transistor and the second terminal of the first transistor are coupled to the clamping circuit, and the control terminal of the second transistor and the control terminal of the first transistor are coupled to the second node.

8. The electrostatic discharge protection circuit of claim 6, wherein the clamping circuit comprises:
   a transistor comprising a first terminal, a second terminal, and a control terminal, wherein the first terminal of the transistor is coupled to ground, the second terminal of the transistor is coupled to the third diode, and the control terminal of the transistor is coupled to the inverter circuit.

9. The electrostatic discharge protection circuit of claim 6, wherein the voltage difference circuit is coupled between the first node and the inverter circuit.

10. The electrostatic discharge protection circuit of claim 9, wherein the anode terminal of the first diode, a second pad, and the clamping circuit are coupled to the first node, and the cathode terminal of the first diode is coupled to the inverter circuit.

11. An electrostatic discharge protection circuit, comprising:
    a first pad configured to receive an input voltage, wherein the first pad is directly coupled to an anode terminal of a first diode and directly coupled to an anode terminal of a second diode;
    a detector circuit directly coupled to a cathode terminal of the first diode, wherein the detector circuit is configured to output a control signal according to the input voltage and a first voltage;
    a clamping circuit directly coupled to a cathode terminal of the second diode, wherein the clamping circuit is configured to provide an electrostatic discharge path according to a voltage level of the control signal; and
    a voltage difference circuit coupled between the clamping circuit and the detector circuit, wherein the voltage difference circuit comprises a third diode, and the third diode comprises a first terminal and a second terminal, wherein the first terminal of the third diode, the second diode, the clamping circuit, and a second pad are coupled to a first node, wherein the second terminal of the third diode is coupled to the detector circuit.

12. The electrostatic discharge protection circuit of claim 11, wherein the detector circuit comprises:
    a capacitor coupled to ground;
    a resistor, wherein the resistor and the capacitor are coupled at a second node; and
    an inverter circuit coupled to the third diode, wherein inverter circuit is configured to output the control signal to the clamping circuit according to a voltage level at the second node.

13. The electrostatic discharge protection circuit of claim 12, wherein the clamping circuit provides the electrostatic discharge path when the control signal has a first voltage level, and the electrostatic discharge path is cut off when the control signal has a second voltage level, wherein the inverter circuit is configured to generate the control signal having the second voltage level according to a time constant corresponding to the resistor and the capacitor.

14. The electrostatic discharge protection circuit of claim 12, wherein the inverter circuit comprises:
    a first transistor comprising a first terminal, a second terminal, and a control terminal, wherein the first terminal of the first transistor is coupled to ground; and a second transistor comprising a first terminal, a second terminal, and a control terminal, wherein the first terminal of the second transistor is coupled to the third diode, the second terminal of the second transistor and the second terminal of the first transistor are coupled to the clamping circuit, and the control terminal of the second transistor and the control terminal of the first transistor are coupled to the second node.

15. The electrostatic discharge protection circuit of claim 12, wherein the clamping circuit comprises:
a transistor comprising a first terminal, a second terminal, and a control terminal, wherein the first terminal of the transistor is coupled to ground, the second terminal of the transistor is coupled to the first node and the control terminal of the transistor is coupled to the inverter circuit.

* * * * *